United States Patent
Ley

(10) Patent No.: US 11,182,499 B2
(45) Date of Patent: Nov. 23, 2021

(54) METHOD OF INTEGRATING AN ORGANIZATIONAL SECURITY SYSTEM

(71) Applicant: Nahor Technologies, Inc., Palmyra, VA (US)

(72) Inventor: Neal Ley, Palmyra, VA (US)

(73) Assignee: Nahor Technologies, Inc., Palmyra, VA (US)

( * ) Notice: Subject to any disclaimer, the term of this patent is extended or adjusted under 35 U.S.C. 154(b) by 311 days.

(21) Appl. No.: 16/291,327

(22) Filed: Mar. 4, 2019

(65) Prior Publication Data

US 2019/0272386 A1 Sep. 5, 2019

Related U.S. Application Data

(60) Provisional application No. 62/638,330, filed on Mar. 5, 2018.

(51) Int. Cl.
| | | |
|---|---|---|
| *G06F 21/62* | (2013.01) | |
| *G06F 21/55* | (2013.01) | |
| *G06Q 10/06* | (2012.01) | |

(52) U.S. Cl.
CPC ........ *G06F 21/6245* (2013.01); *G06F 21/552* (2013.01); *G06F 2221/034* (2013.01); *G06F 2221/2101* (2013.01); *G06Q 10/06395* (2013.01)

(58) Field of Classification Search
CPC ........................... G06F 21/6245; G06F 21/552
See application file for complete search history.

(56) References Cited

U.S. PATENT DOCUMENTS

| | | | | |
|---|---|---|---|---|
| 10,282,550 | B1* | 5/2019 | Sheridan | G06F 21/577 |
| 10,541,938 | B1* | 1/2020 | Timmerman | H04L 43/065 |
| 2008/0082376 | A1* | 4/2008 | Kennis | G06F 16/258 |
| | | | | 705/7.15 |
| 2009/0300711 | A1* | 12/2009 | Tokutani | G06F 21/554 |
| | | | | 726/1 |
| 2011/0126111 | A1* | 5/2011 | Gill | G06F 21/577 |
| | | | | 715/736 |
| 2011/0246419 | A1* | 10/2011 | Yancey | G06F 11/14 |
| | | | | 707/624 |
| 2012/0216243 | A1* | 8/2012 | Gill | G06Q 10/063 |
| | | | | 726/1 |
| 2012/0224057 | A1* | 9/2012 | Gill | H04L 63/102 |
| | | | | 348/143 |
| 2019/0236661 | A1* | 8/2019 | Hogg | H04L 63/1433 |
| 2019/0327271 | A1* | 10/2019 | Saxena | G06N 3/0454 |
| 2020/0380138 | A1* | 12/2020 | Agarwal | G06F 21/566 |

OTHER PUBLICATIONS

Gheorghe (Security Policy Enforcement in Service-Oriented Middleware, PhD Dissertation, Dec. 2011, 239 pages) (Year: 2011).*

* cited by examiner

*Primary Examiner* — Oleg Korsak

(74) *Attorney, Agent, or Firm* — John H. Thomas, P.C.

(57) ABSTRACT

An integration security tool set integrates a suite of security tools with an organization process and work flow, coordinated and managed by the integrated tool set, to manage server and database security. The integration tool set communicates with different security tools to ensure that different sets of security rules are implemented in the servers and databases in the organization.

5 Claims, 10 Drawing Sheets

ORGANIZATION SERVERS, DATABASES, GROUPS, ROLES, ADMINISTRATIVE PRIVILEGES AND ACCESS TO TABLES

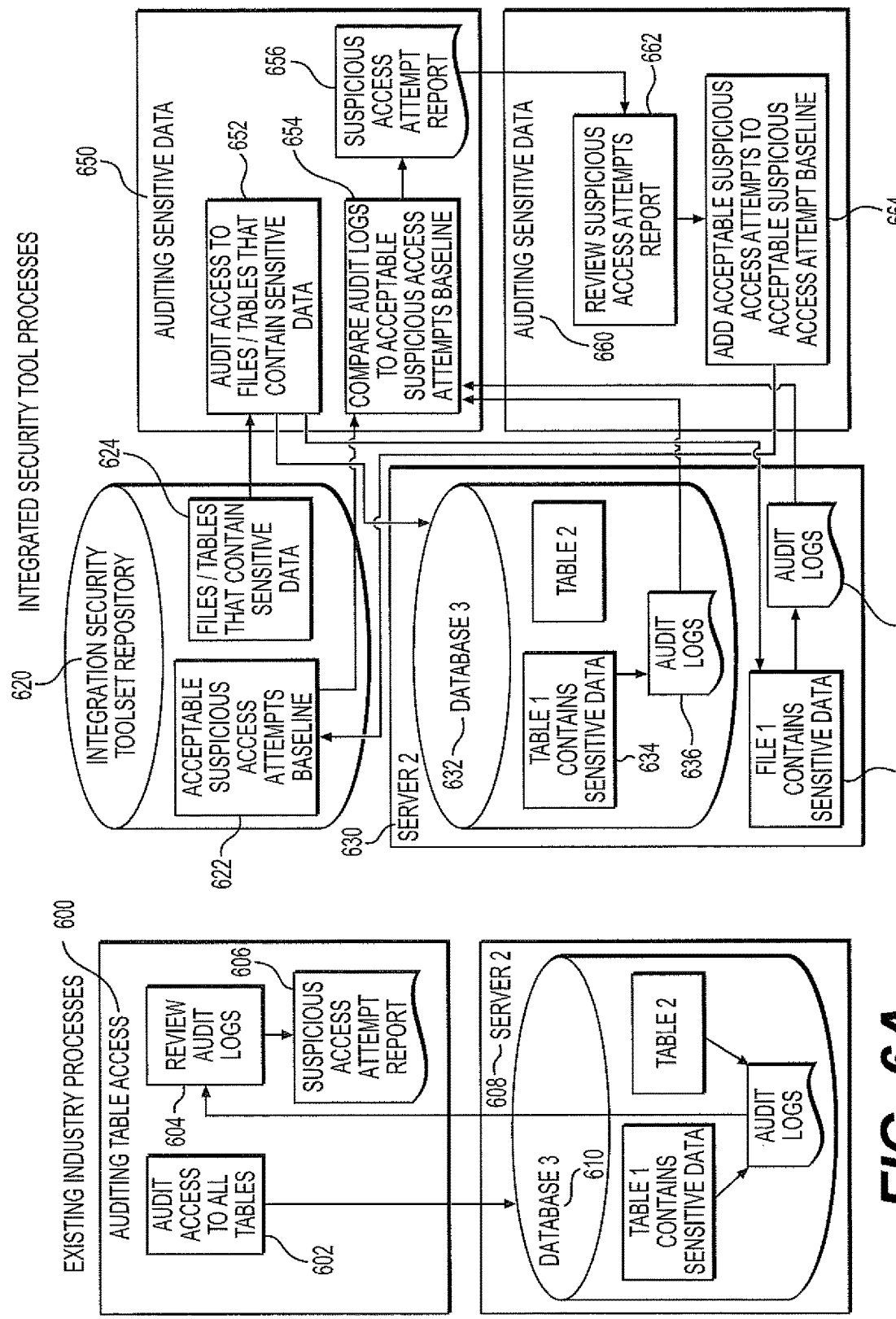

METHOD OF INTEGRATING AN ORGANIZATIONAL SECURITY SYSTEM

This application claims the benefit of filing of U.S. Provisional Patent Application No. 62/638,330, filed Mar. 5, 2018, which is incorporated by reference herein in its entirety.

An integration security tool set integrates a suite of security tools with an organization process and work flow, coordinated and managed by the integrated tool set, to manage server and database security. The integration tool set communicates with different security tools to ensure that different sets of security rules are implemented in the servers and databases in the organization.

BACKGROUND

Current industry tools for assessing the security state of an organization's servers and databases use the same security standard for all of the organization's servers and databases and are not flexible enough to focus security efforts on the servers and databases that contain the most sensitive data. The current industry approach consists of using multiple independent tools for protecting a company's data. Those tools search for sensitive data within files and databases and assess the security configuration of the servers and databases and provide for access management. Further, those tools verify appropriate access to sensitive files and/or tables. The tools check that database procedures have not been changed. The different tools that perform the various tasks as mentioned above perform independently and are not integrated together. Therefore, users are lacking an efficiency of information sharing so that the information from each of the tools could be used to make the other tools more effective.

Another drawback with the use of multiple independent tools for server and database security is that the tools, being independent of each other, do not have access to information with regards to the sensitivity of the data within the files and databases. The independent tools cannot provide the most security for the most sensitive data in the production environments (and any other technical environments) to ensure that limited resources are more effectively used to protect that data.

Another issue is that access management tools for databases do not identify roles within the organization databases or groups on the servers that have been granted access to sensitive data, either directly or indirectly. Database security configuration tools typically store a set of SQL statements that are run against a database to determine the security stance of the database. The server and database security configuration tools do not have the benefit of including the approved access requests to identify authorized access to provide a suppression authorization workflow to identify required security configuration violations. Activity monitoring tools are generally configured to audit all access or do not audit any access. A problem with this is the amount of resources needed for tracking, storing and verifying all of this access versus concentrating on access to sensitive data. Security tools do not work in conjunction with the applications to flag suspicious access to sensitive data. Tools that ensure that database objects have not been changed will check all of the objects within the database but will not target the objects that are dependent on tables that contain sensitive data.

SUMMARY

Accordingly, it is an object of the present invention to provide an integrated security tool set that encompasses and integrates a suite of server and database security tools and an organization business process and work flow, coordinated and managed by the integrated tool set to manage server and database security. Within the integrated security tool set, each tool has specialized enhancements and nuances specifically developed to function in concert with each other and assist in managing the technical processes and business process as explained further herein.

Functions performed by the integrated security tool set include a sensitive data search tool which feeds into the security compliance tool and the database object change tool, a security compliance tool which communicates to and from the access management tool as well as feeding into the auditing tool, an access management tool which communicates to and from the security compliance tool, a database object change tool and an auditing tool all combined into one tool set that enables the tools to share information to improve automation and focus an organization's security efforts on sensitive data in the production environment (or any technical environment that includes databases) that the organization would be the most interested in protecting.

In one example, a method of integrating an organizational security system comprises multiple steps including providing an access management process for an organization comprising a plurality of servers and databases, wherein the access management process creates a matrix of groups from the servers and roles from the databases that can be requested by a user and after approval by the user's manager, and the access management process grants the requested groups and roles to a user to provide access for the user to one or more of the organization servers and databases. The method further includes providing a security compliance process comprising sets of security compliance rules that define security configurations for the organization servers and databases and that define groups on the servers and roles in the databases that need to be protected, and wherein the security compliance process identifies and reports on any violations of the rules in the sets of the security compliance rules by the security configurations and the assigned groups on the servers and the roles in the databases. The method also includes providing an integration tool that operatively marks the matrix of groups from the servers and the roles from the databases as restricted if they have been granted rights that violate the rules in the sets of the security compliance rules. And wherein the integration tool allows the access management process to highlight restricted groups and roles during an initial user access request or profile creation, during the approval step performed by the user's manager, as well as allowing requests for restricted groups and roles to be optionally routed through a second approval step, thereby preventing restricted groups and roles from being accidentally granted to users and eliminating the need to go back later and remove those restricted groups and roles.

The method of integrating an organizational security system may include wherein the integration tool comprises a sensitive data search process that produces a report that identifies groups on the servers and roles in the databases that require protection so that these groups and roles can be added to the list of restricted groups and roles in the access management process and added to the list of security compliance rules that need to be checked in the security compliance process. The integration tool may comprise a security compliance process that compares the access management requests and profiles with the security compliance violations to determine if any violations of the security compliance rules can be ignored because of a corresponding access management request or profile that has all necessary approvals based on the level of access requested. The integration tool may comprise an auditing process that compares access attempts to restricted files/tables with a baseline to detect a suspicious access attempt to identify possible intrusion of a protected file/table, wherein the baseline is the list of previous user access from the same user-or users with similar access, thereby concentrating the process on files/tables that contain sensitive information and not on all files/tables. The integration tool may provide a workflow to allow a security group to be able to accept suspicious access attempts so that the approved access attempts can be added to the approved baseline. The integration tool may comprise a security compliance process that marks all roles as restricted that have been granted restricted roles, and further wherein the searching process would be performed recursively until all role grants have been searched, thereby ensuring that all roles are marked as restricted that have access to restricted rights through an iterative process of granting roles to other roles creating a chain of access. The integration tool may comprise an access management process that can limit the list of requestable roles or groups to those that do not have a group name and those that have the same group name as the user who is requesting the roles or groups in the access management process. The integration tool may provide a reviewable list of modified database objects that are dependent on restricted tables, thereby concentrating the security compliance process on database objects that access sensitive information and not on all database objects within the database. And the integration tool may provide a reviewable audit log of failed access attempts on functions or procedures that access tables with sensitive information, thereby concentrating the security compliance process on functions or procedures that access sensitive information and not on all functions or procedures within the database.

BRIEF DESCRIPTION OF THE DRAWINGS

FIG. 6A is a sample flowchart displaying how prior art security systems work in part. FIG. 6B is a flowchart of how the integration system and method described herein may work in part to focus auditing on sensitive files/tables and then using a baseline of acceptable previous access attempts of the user or users with similar access to determine unacceptable access attempts.

DETAILED DESCRIPTION

The present invention operates in an organization that includes multiple servers and multiple databases. A plurality of users is provided access to the different servers and databases. In a larger organization, different users will be granted access to only some, and typically not all, of the servers and databases. For instance, organization employee users may be working in entirely different departments in the organization including research and development, production, sales and marketing, accounting, human resources and other groups. It is not desirable or sensible that all employees have access to every server or database.

Figure 1:
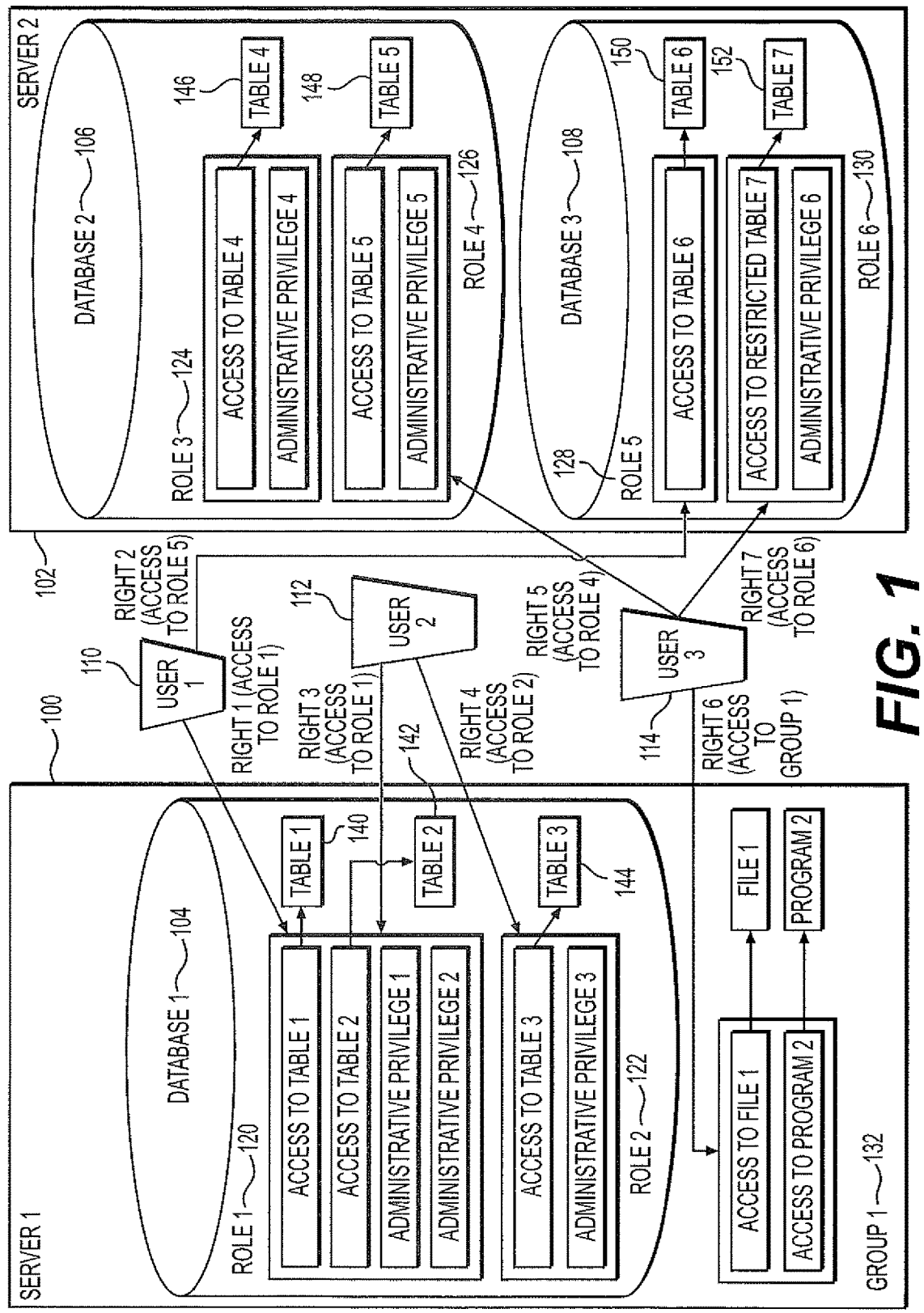
FIG. 1 is a flowchart of a representational example of an organization with multiple different servers and databases that is an example of the working environment of the system and method described herein.

As illustrated in FIG. 1, organizations may have multiple servers and databases that may be accessed by groups of users that can themselves have multiple roles and involve administrative privileges and access to tables of organization information. Some of this information is proprietary or otherwise secret and needs to be protected by an organization security system. In FIG. 1, there is shown server 1 100 and server 2 102. These servers 100 and 102 have databases. Server 1 100 has a database 1 104. Server 2 102 has two databases, database 2 106 and database 3 108. Database 1 104 includes role 1 120 and role 2 122. Each of these roles 120 and 122 have different accesses and administrative privileges as indicated. These roles 120 and 122 allow access to table 1 140, table 2 142 and table 3 144. Server 1 100 also includes a group 1 132 having access to files and programs indicated. Database 2 106 in server 2 102 includes role 3 124 and role 4 126, each with their accesses and administrative privileges indicated. In database 2 106 and role 3 124 and role 4 126, there is granted access to table 4 146 and table 5 148 respectively. And database 3 108 includes role 5 128 and role 6 130 that have accesses to table 6 150 and table 7 152 and administrative privilege respectively. In this example of FIG. 1, there are three users 110, 112 and 114 that each exercise different rights to have different accesses to databases 104, 106 and 108. User 1 110 has rights 1 and 2. User 2 112 has rights 3 and 4, and user 3 114 has rights 5, 6 and 7 as indicated. The functionality and flow of access and information is illustrated by the multiple lines and arrows in FIG. 1.

Figure 2:
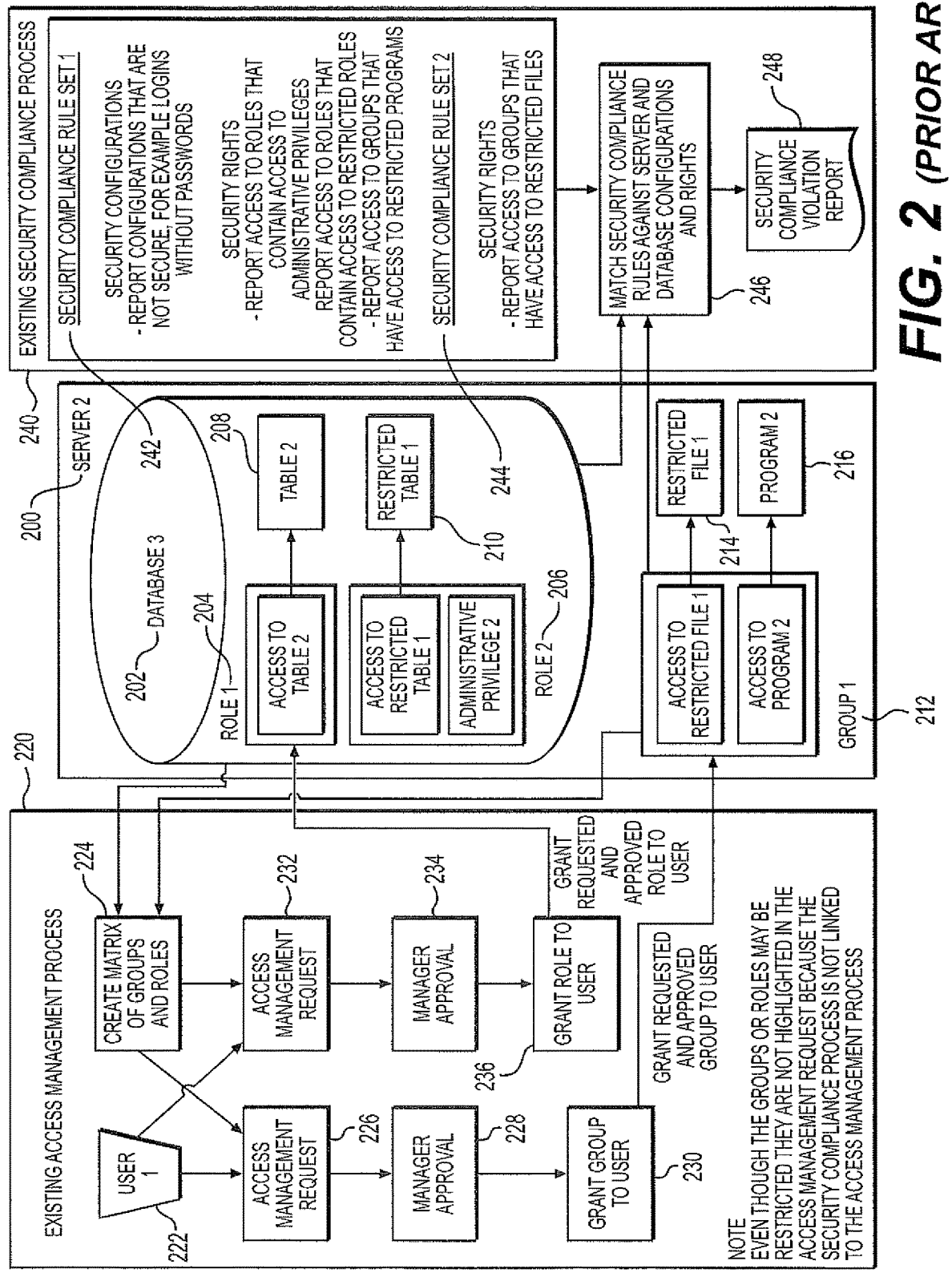
FIG. 2 is a flowchart of a prior art example of how different security processes previously have worked independently.

As described in the Background earlier, current security systems operate in a disjointed fashion. The result is inadvertently unintended access by users to servers and databases that they do not need access to. As shown for example in FIG. 2, there is a single server 2 200 having a single database 3 202 and a single group 1 212 therein. The database 3 202 includes role 1 204 and role 2 206 that illustrate accesses to table 2 208 and restricted table 1 210 and administrative privilege. Server 2 200 also includes group 1 212 that shows access to restricted file 1 214 and program 2 216. In order to secure server 2 200, there is deployed both an access management process 220 and a security compliance process 240. As illustrated, however, there is no communication between the access management process 220 and the security compliance process 240. The access management process 220 example includes a user 222 and a predetermined matrix of groups and roles 224. Based on the matrix of groups and roles 224, a user 222 may submit an access management request, in this example, two requests 226 and 232. Those requests 226 and 232 receive manager approval 228 and 234 respectively, to grant a group 230 and a role 236 to the user 1 222. In parallel to the access management process 220, there is a security compliance process 240 that includes two security compliance rule sets 242 and 244. These rule sets 242 and 244 are used to match security compliance rules against server and database configurations and rights 246 to subsequently generate a security compliance violation report 248. FIG. 2, therefore, demonstrates the challenges and shortcomings of prior art security systems and methods.

In discussing the present integration tool, it is important to have a specific vocabulary so that there is no confusion about what is being discussed. The following glossary provides a list of definitions as intended with respect to the present tool set.

Glossary

Access management process—Workflow tool used to request database access, approve access requests and provision access once it is approved.
Administrative Privilege—a privilege is a right to perform an activity in a database, for example CREATE DATABASE, and CREATE USER.
Auditing process—A process to review changed database objects, failed function or procedure access and potential database intrusion audits.
Data Dictionary—Set of system tables within a database that contain the security configuration information for that database.
Database Objects—objects within the database that have definitions that contain code that accesses tables, for example, packages, procedures, functions, and views.
Database Object Change Process—A process to monitor changes to database objects.
Database Security Subject Matter Expert (SME)—Individual(s) who are charged with establishing and monitoring the security status of an organization databases.
Group—A group is a group membership of one or more users on a server that provides privileges to access files and applications.
Profile—A profile is a collection of roles and/or groups that are defined to be granted to a user who performs an organization's job role.
Repository—A database that stores all of the information for the integrated security toolset. The information would contain, but not limited to, security compliance rules and access management requests.
Restricted privileges—A group on a server or a table, role or administrative privilege that should be protected from everyday use.
Rights—Membership in a group on a server, or access to roles within a database that enable a user to perform activities on the server or within the database.
Role—A role is a way to group privileges within the database, these privileges can be other roles, data access privileges and/or administrative privilege granted to it.
Security Compliance Process—A process to identify security violations by reporting on discrepancies between security compliance rules and server and database configurations and rights.
Security Compliance Rules—A combination of security configurations and restricted rights that establish a secure configuration for a device (database or server).
Security Compliance Violation Report—A report of server or database items that violate the security compliance rules (both the security configurations and the security rights that are to be protected).
Security Configurations—Database and server settings that provide the security level desired by the organization.
Sensitive data report—A report of sensitive columns within the tables within the target databases or files on the target servers that contain sensitive data.
Sensitive data search criteria—Criteria that would be used to identify files or columns that contain sensitive data.
Sensitive data search process—A process used to match sensitive column search criteria to identify files or tables that contain sensitive data.
Sensitive files—Files that contain sensitive data.
Sensitive information—Data that contains information that should be protected, for example NPI (non public information), HIPAA (health information), proprietary or confidential information.
Sensitive tables—Tables that contain columns that contain sensitive data.
Server Security Subject Matter Expert (SME)—Individual(s) who are charged with establishing and monitoring the security status of the organization servers.
System of record—Repository that contains a list of all of an organization's databases.
Table—An object in a database that stores data.
Target Database—Database that is to be secured.
Target Server—Server that is to be secured.

The organizational security tool as described herein includes an integration tool that is installed in an organizations data and communication system that includes a plurality of servers and databases and multiple users who work with and in the servers and databases. The integration tool will operate within this organization in order to improve security, for instance, by making the organization systems communicate and interact in a proactive manner rather than reactively. The integration tool that comprises software, in the form of a suite of tools, that is installed in security toolset repository. The integration tool interacts with an organization system is described in the following.

The first step in the security system integration process is to search the target servers and databases using a Sensitive Data Search process for files/tables that contain sensitive data (sensitive data is determined per criteria set by persons in the business and outlined in a "Sensitive Data Search Criteria"). Once the sensitive files/tables—also understood as files/tables that contain sensitive data—are found, then these can be flagged to be protected and audited. The list of sensitive files/tables that are being protected will be used by all of the other processes within the tool set to create efficiencies that enable focused attention on securing these files/tables.

A Security Compliance Process will assess the target server or database to determine if any of the configurations or rights (e.g., permissions for files, privileges for tables, views, functions, procedures or administrative privileges)

violate a Security Compliance Rule Set, these to be known as Security Compliance violations. Approved access requests, for server and database access, through the Access Management Process will be used by the Security Compliance Process to enable the Security Compliance Process to ignore Security Compliance violations that are associated with approved access requests. Similarly, approved suppression requests (i.e. requests to suppress security compliance violations that have been approved by the security team because the configuration, permissions or privileges are required for an application or a user to work correctly) will be used by the Security Compliance Process to ignore the associated Security Compliance violations.

The Security Compliance Process stores system permissions, privileges, roles and tables to be protected—as outlined in the Security Compliance Rule Set—rather than storing SQL statements to be run against the target database. The roles in the database will be recursively traversed to find all of the privileges that have access to these objects that are to be protected. The Integrated Security tool set is able to retrieve audit logs for failed access attempts to database functions and procedures. Further auditing functionality is to report on changed database objects that are dependent on sensitive tables. The Auditing Sensitive Data Process audits and reports on SQL statements that have been executed against sensitive tables. The sensitive SQL statements are compared against previous SQL statements that have been executed by the same user or users who have the same level of access to the database. The comparison will report on SQL statements that do not match previously approved SQL statements to provide an intrusion detection auditing function. Additionally, the Auditing Sensitive Data Process audits and reports on access to sensitive files. The sensitive access is compared against previous accesses that have been executed by the same user or users who have the same level of access to the server. The comparison will report on access that does not match previously approved access to provide an intrusion detection auditing function.

The integration tool is used to protect both server security as well as individual database security. The integration tool protects both, but in slightly different ways specific to those system environments. Each is discussed separately in the following.

The Database Security Portion of the Integration Tool Set

1. An organization security team identifies the target databases within the organization that are to be secured. These target databases can be entered into the system from the system of record. Connection information (host name, port number and username) for the target databases have to be entered into the system so that the security tool can connect to the target databases.
2. Sensitive data search criteria for the databases is entered into the system. The search criteria should include all of the usual column names used by the organization for the sensitive data that the organization is interested in protecting. This list should be all inclusive so that all of the tables that contain sensitive information in all of the target databases can be recorded in the system to be used by all of the other tools.
3. Secure system configuration parameters as determined by the security SME are entered into the system. These would be defined in the Security Policy. This would include configuration parameters to make the system secure, for example disabling anonymous logins.
4. The sensitive column search criteria is matched against a data dictionary table that contains the columns within each table within the target databases to create a matrix of database tables that contain sensitive columns (sensitive column matrix).
5. The database security SME and application managers review the sensitive column matrix (from step 4) to mark database tables that are to be protected (sensitive tables). The database tables can also be marked to be audited with the level of auditing (insert, update delete or select) being specified. Once the level of auditing is specified for a particular table then the system will enable that level of auditing for that table.
6. System privileges, tables and roles that are to be protected as determined by the database security SME are entered into the system. These would be defined in the Security Policy. This would include the following:
   a. system privileges that need to be restricted, for example the ability to execute SQL as the main system account.
   b. roles that need to be restricted because of the privileges that they have been granted, for example the ability to execute SQL as the main system account.
   c. system tables that need to be restricted, for example system tables that document the privileges that have been granted to the roles.
7. The sensitive tables (from step 5) are combined with the system privileges and tables to be restricted (from step 6) to provide a comprehensive list of tables and system privileges to be protected. The comprehensive list of tables and privileges are used to recursively search the roles in the target databases to find all roles that have been granted these tables and system privileges either directly or indirectly. The list of roles that have been granted these tables and system privileges are combined with the roles to be restricted (from step 6) to create a list of roles that are to be restricted. This becomes the set of roles to be restricted (restricted role matrix).

System privileges, tables and roles can be restricted to certain groups by entering access groups. These privileges would only be available to the users who have the same access group specified, thereby allowing restricted roles to be hidden from most users. In addition, the system privileges, tables and roles can be restricted for different environments by entering resource labels. The checks with resource labels would only be made against databases that have the same resource label, for example Production.
8. All of the roles are pulled from the target databases and stored into the system. The roles that are to be restricted (from step 7) are marked as restricted in the system with the details of the reason(s) for the restrictions along with potential remediation steps that can be taken.
9. Employee information along with their manager information can be entered in the Access Management tool from the HR system to be used by the access management workflow.
10. The Access Management tool provides a list of roles for the target databases. Restricted roles can be restricted to certain groups where the roles are only allowed to be selected by users that have the same group access identifier as the one entered in step 7 for restricted roles.

11. Access requests are entered into the system with requests for restricted roles being highlighted at the outset. An approval workflow is built into the system that requires a user's manager to approve the request. An additional layer of approval can be required for a particular database based on requirements specified in the system. Access requests for restricted roles are flagged as restricted when they are presented as roles to be chosen. During the access request creation stage additional information for the reason for the restriction as well as potential remediation steps that can be taken are available. Email notifications are sent to the approvers for all of the approval steps.

12. Access management requests for restricted roles are flagged as restricted when the managers are approving the requests.

13. Access requests for restricted roles are sent to the database security SME for additional approval.

14. Once access requests are approved, the accounts are created, modified or deleted with an email notification being sent once the account has been provisioned.

15. Database access can automatically be revoked based on active employee data feed from the HR system if the employee is marked as inactive.

16. Restricted roles (from step 7), system privileges and tables to be restricted (from step 6) and secure system configurations (from step 2) are used by the security configuration tool to check for security violations in the target databases to create a security violation report.

17. Security violations (from step 16) are cross referenced against approved access requests (from step 13) and matches are removed from the security violation report.

18. Individual security violations (from step 16) will be suppressed once they have been requested to be suppressed and the suppression has been approved by the security team.

19. Procedures that are dependent on restricted tables are monitored to ensure that they are not created or modified. Changes are presented on a list where the changes can be approved or denied. Approval means that the changes will be removed from the report.

20. Audit logs from procedures that are dependent on sensitive tables are reviewed for failed access attempts to sensitive tables. Attempts are presented on a list where the attempts can be approved or denied. Approval means that the attempts will be removed from the report.

21. Audit records from tables that had auditing turned on are checked for suspicious behavior. Suspicious behavior would be behavior that has been not been previously observed and authorized by this user or by users that have the same access privileges. Other suspicious behavior would be users who are selecting all columns from a table (select *). Bad programming practice is to select all columns from a table using a SQL statement similar to select * from table;

22. SQL statements that have been marked as suspicious can be accepted or declined so that they can be added to the set of acceptable SQL statements.

The Server Security Portion of the Tool Set

1. A security team identifies the target servers that are to be secured. These target servers can be entered into the system from the system of record. Connection information (host name and username) for the target servers have to be entered into the system so that the security tool can connect to the target servers.

2. Sensitive data search criteria for the servers is entered into the system. The search criteria should include all of the usual data formats used by the organization for the sensitive data that the organization is interested in protecting. This list should be all inclusive so that all of the files that contain sensitive information in all of the target servers can be recorded in the system to be used by all of the other tools.

3. Secure system configuration parameters as determined by the security SME are entered into the system. These would be defined in the Security Policy. This would include configuration parameters to make the system secure, for example disabling anonymous logins.

4. The sensitive column search criteria is used to search for files that contain the sensitive data within the target servers to create a matrix of files that contain sensitive data (data protection matrix).

5. The Server security SME and application managers review the data protection matrix (from step 4) to mark server files that are to be protected (sensitive files). The server files can also be marked to be audited with the level of auditing (read, modified or deleted) being specified. Once the level of auditing is specified for a particular file then the system will enable that level of auditing for that file.

6. System groups that are to be protected as determined by the security SME are entered into the system. These would be defined in the Security Policy.

7. The sensitive groups (from step 5) are combined with the system groups to be restricted (from step 6) to provide a comprehensive list of groups to be protected. This becomes the set of groups to be restricted (restricted group matrix).

Groups can be restricted to certain groups by entering access groups. These groups would only be available to the users who have the same access group specified, thereby allowing restricted groups to be hidden from most users. In addition, the system groups can be restricted for different environments by entering resource labels. The checks with resource labels would only be made against servers that have the same resource label, for example Production.

8. All of the groups are pulled from the target servers and stored into the system. The groups that are to be restricted (from step 7) are marked as restricted in the system with the details of the reason(s) for the restrictions along with potential remediation steps that can be taken.

9. Employee information along with their manager information can be entered in the Access Management tool from the HR system to be used by the access management workflow.

10. The Access Management tool provides a list of groups for the target servers. Restricted groups can be restricted to certain groups where the groups are only allowed to be selected by users that have the same group access identifier as the one entered in step 7 for restricted groups.

11. Access requests are entered into the system with requests for restricted groups being highlighted at the outset. An approval workflow is built into the system that requires a user's manager to approve the request. An additional layer of approval can be required for a particular server based on requirements specified in the system. Access requests for restricted groups are flagged as restricted when they are presented as groups to be chosen. During the access request creation stage additional information for the reason for the restriction as well as potential remediation steps that can be taken are available. Email notifications are sent to the approvers for all of the approval steps.

12. Access management requests for restricted groups are flagged as restricted when the managers are approving the requests.
13. Access requests for restricted groups are sent to the Server security SME for additional approval.
14. Once access requests are approved the accounts are created, modified or deleted with an email notification being sent once the account has been provisioned.
15. Server access can automatically be revoked based on active employee data feed from the HR system if the employee is marked as inactive.
16. Restricted groups (from step 7) and secure system configurations (from step 2) are used by the security configuration tool to check for security violations in the target servers to create a security violation report.
17. Security violations (from step 16) are cross referenced against approved access requests (from step 13) and matches are removed from the security violation report.
18. Individual security violations (from step 16) will be suppressed once they have been requested to be suppressed and the suppression has been approved by the security team.
19. Audit records from files that had auditing turned on are checked for suspicious behavior. Suspicious behavior would be behavior that has been not been previously observed and authorized by this user or by users that have the same access privileges.
20. Access that has been marked as suspicious can be accepted or declined so that they can be added to the set of acceptable accesses.

The remaining FIG. 3-10 illustrate the foregoing flow of functionality and information with respect to the integration system and method. Where helpful in FIGS. 2, 4A, 5A, 6A and 9A, the prior art operation is shown in a comparative manner to highlight the differences from the system and methods herein.

Figure 3:
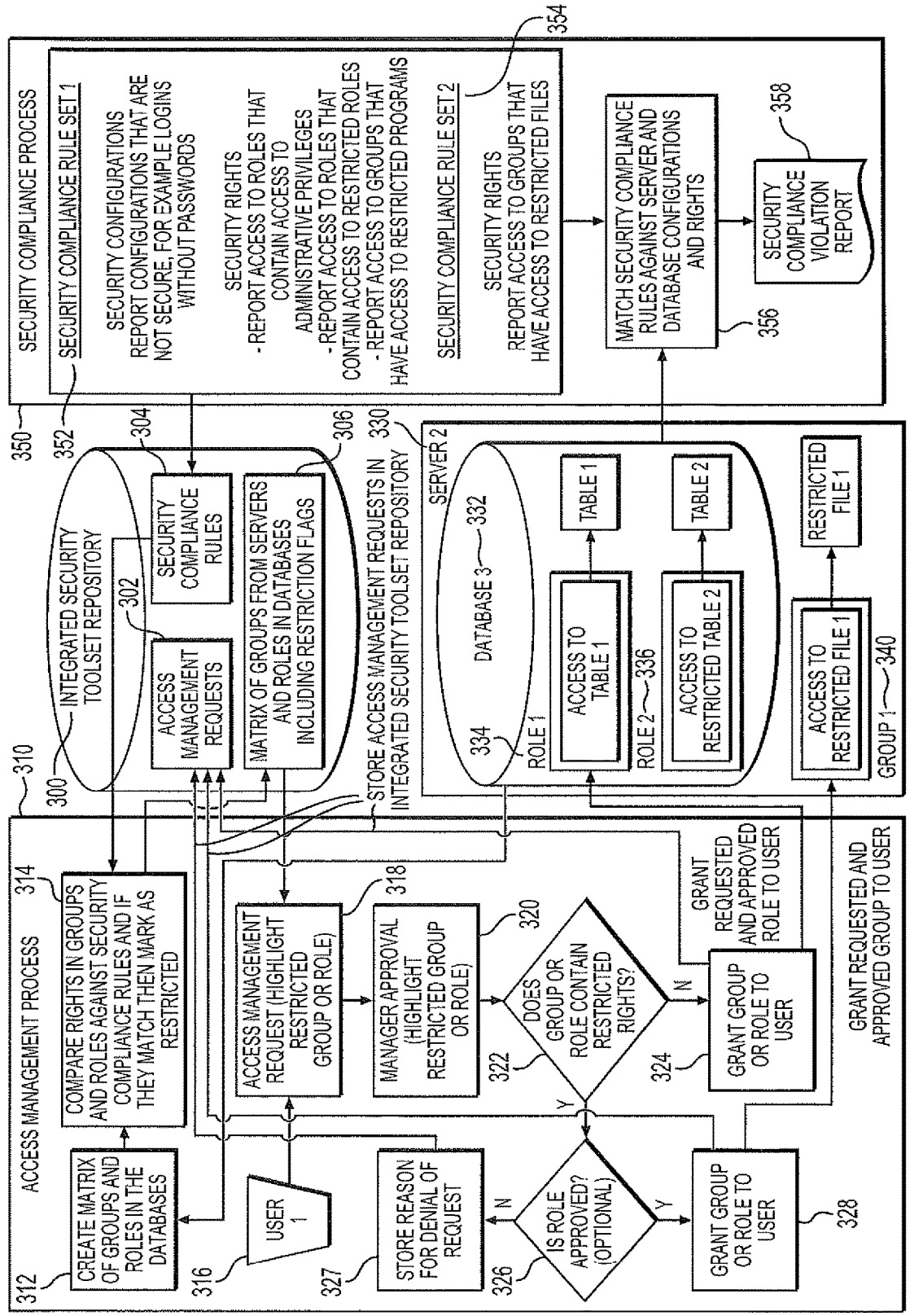
FIG. 3 is a flowchart of an example of the integration process and method described herein where different security processes share information to more effectively protect sensitive information.

FIG. 3 illustrates an organization access management process 310, a security compliance process 350 and an example of a server 2 330. In an organization, it is assumed that there will be multiple servers that will used. In this FIG. 3, only server 2 330 is used as an example. An integrated security toolset repository 300 is illustrated showing the intercommunication of the access management process 310 with the security compliance process 350 with respect to access to files and tables in the server 2 330.

Turning first to the access management process 310, there is a matrix 312 of groups and roles in the databases. The matrix 312 is then used to compare 314 rights in groups and roles against security compliance rules 304, and if they match then they are marked as restricted. This comparison 314 is then sent and saved in a matrix 306 of groups from servers and roles in databases including restriction flags as stored in the integrated security toolset repository 300. An example user 1 316 then makes an access management request 318. A manager approval 320 is required. If the access management request 318 contains a group or role having restricted rights 322, then an additional approval 326 may be required. If there is no group or role containing restricted rights 322, then the group or role is granted 324. Similarly, if an additional approval 326 is granted 328, then group or role is made available to the user 1 316. If the user 1 316 is denied 327, then that denial is stored in the access management requests 302 in the integrated security toolset repository 300.

In the security compliance process 350, there is found two security compliance rule sets 352 and 354. These example security compliance rule sets 352 and 354 are matched 356 with server and database configurations and rights. Depending on this match 356, a security compliance violation report 358 is created and stored.

Server 2 330 is shown in this example as having database 3 332 and group 1 340. Database 3 332 includes role 1 334 and role 2 336 and the accesses and tables noted therein.

The integrated security toolset repository 300 holds the matrix 306 of groups from servers and roles in databases that include restriction flags that as shown receives input from both the access management process 310 and the security compliance process 350. This way, the user 1 316 access management request 318 already has input from both aspects of the organization security as a result of the integrated security toolset repository 300.

Figure 4B:
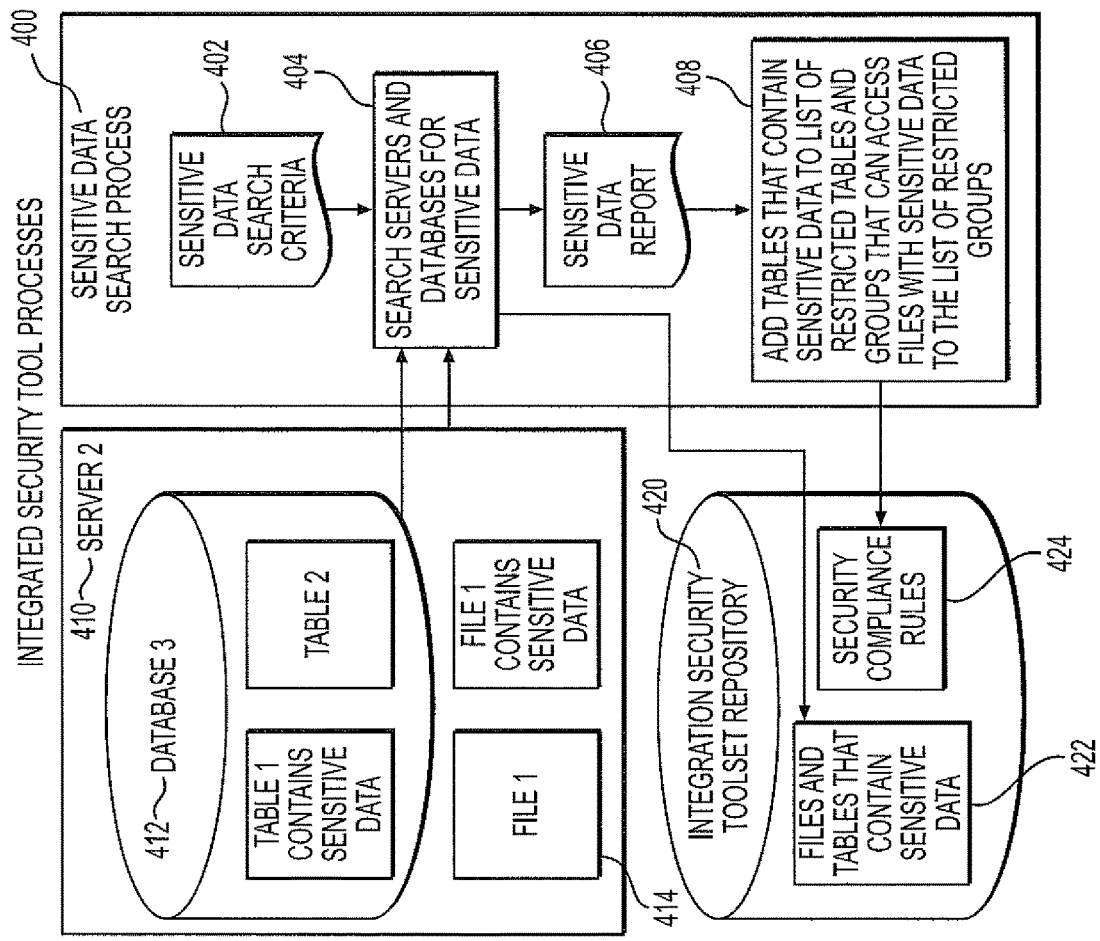
FIG. 4B is a flowchart of how the integration system and method described herein work in part to integrate the sensitive data search process.
Figure 4A:
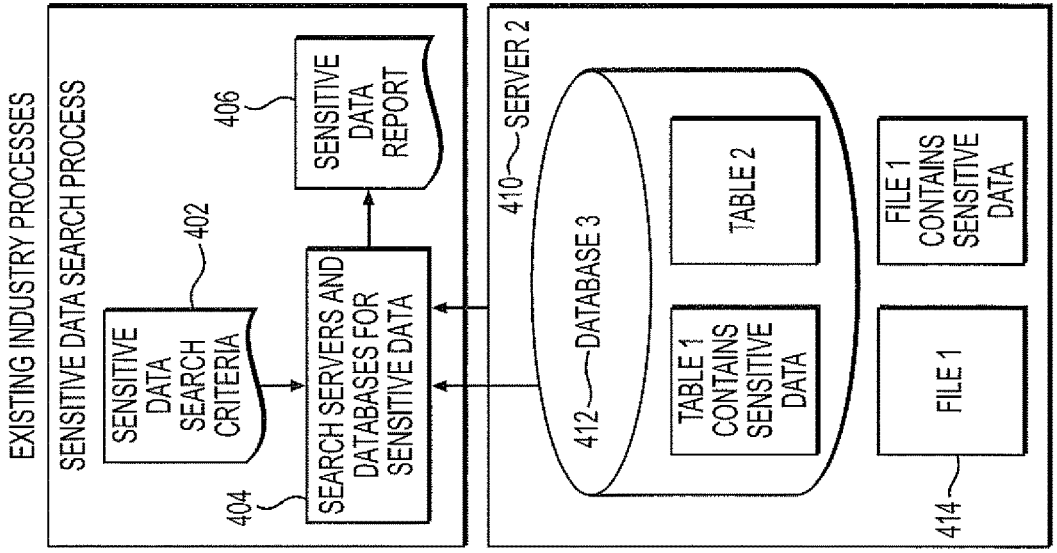
FIG. 4A is a sample flowchart displaying how prior art security systems work in part.

FIG. 4A illustrates the existing security technology regarding a sensitive data search process 400. The sensitive data search process begins with entering sensitive data search criteria 402 that is used to search servers and databases for sensitive data 404 to create a sensitive data report 406. In FIG. 4A, the sensitive data search criteria 402 were applied to server 2 410 including its database 3 412 and its tables and file 1 414.

FIG. 4B illustrates a sensitive data search process 400, searches servers and databases for sensitive data 404 and produces a sensitive data report just like in FIG. 4A, only the additional step of adding tables 408 that contain sensitive data to the list of restricted tables 422 and groups that can access files with sensitive data to the list of restricted groups in the security compliance rules 424 in the integration security toolset repository 420. The files and tables that contain sensitive data are also stored in the security toolset repository 420 with security compliance rules 424.

Figure 5B:
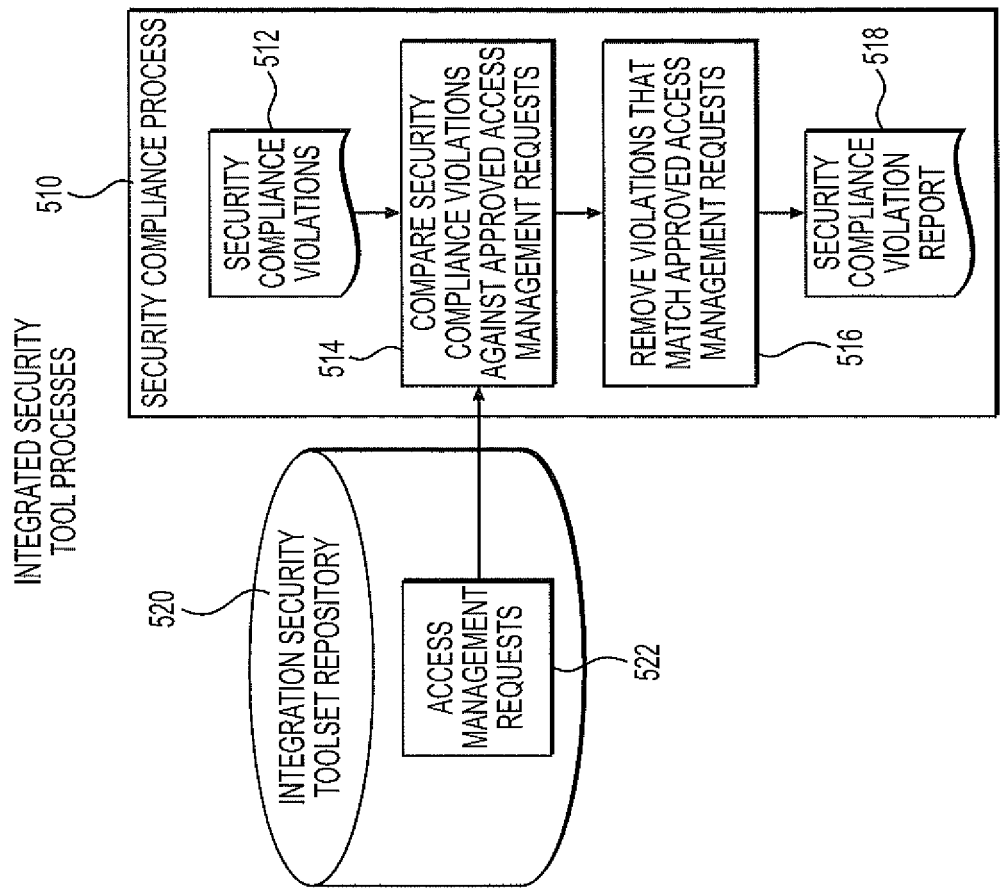
FIG. 5B is a flowchart of how the integration system and method described herein may work in part to use approved access management requests to ignore security compliance violations
Figure 5A:
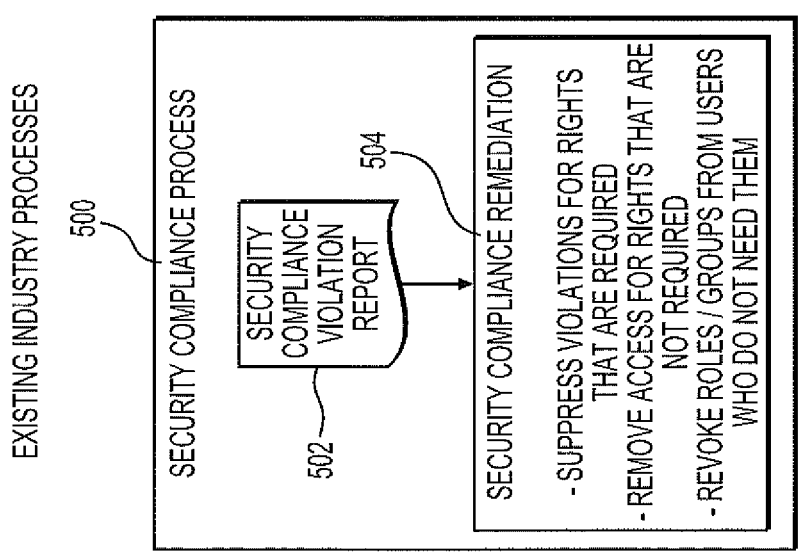
FIG. 5A is a sample flowchart displaying how prior art security systems work in part.

FIG. 5A illustrates an existing security compliance process 500 where a security compliance violation report 502 leads to a security compliance remediation 504 that includes possible after-the-fact violation remediation.

FIG. 5B illustrates how an integration security toolset repository 520, and specifically access management requests 522 can be inserted into a security compliance process 510. Security compliance violations 512 are compared 514 against approved access management requests 522 so that otherwise violations 516 are removed from the violation report if the violations match an approved access management request. Only then is the security compliance violation report 518 generated.

FIG. 6A illustrates an existing method of auditing table access 600 in an organization system. First there is an audit access 602 to all tables. In this example, the audit access 602 is directed to server 2 608 and specifically to database 3 610 in that server 2 608. The access is logged in audit logs and forwarded to review audit logs 604 to then ultimately generate a suspicious access attempt report 606.

In FIG. 6B, an integration security toolset repository 620 includes a list 624 of files and tables that contain sensitive data. The repository 620 also includes an acceptable suspicious access attempts baseline 622. The illustrated audit relates to server 2 630 and its database 3 632 and file 1 638. The database 3 632 contains two tables 1 and 2, but only table 1 634 contains sensitive data. Table 1 634 would have its access logged in audit log 636. (Without any sensitive data, table 2 is not audited.) Similarly, because file 1 638 contains sensitive data, it is also logged to create an audit log 640.

The sensitive data may be audited in at least two levels. The auditing sensitive data 650 includes an audit access to files/tables that contain sensitive data 652. The audit logs 636 and 640 are then compared 654 to acceptable suspicious access attempts baseline 622 in order to create a suspicious access attempt report 656. A different audit level is undertaken by a second auditing sensitive data 660. This includes a review of the suspicious access attempts report 662 in order to add 664 acceptable suspicious access attempts to acceptable suspicious access attempt baseline 622.

Figure 7:
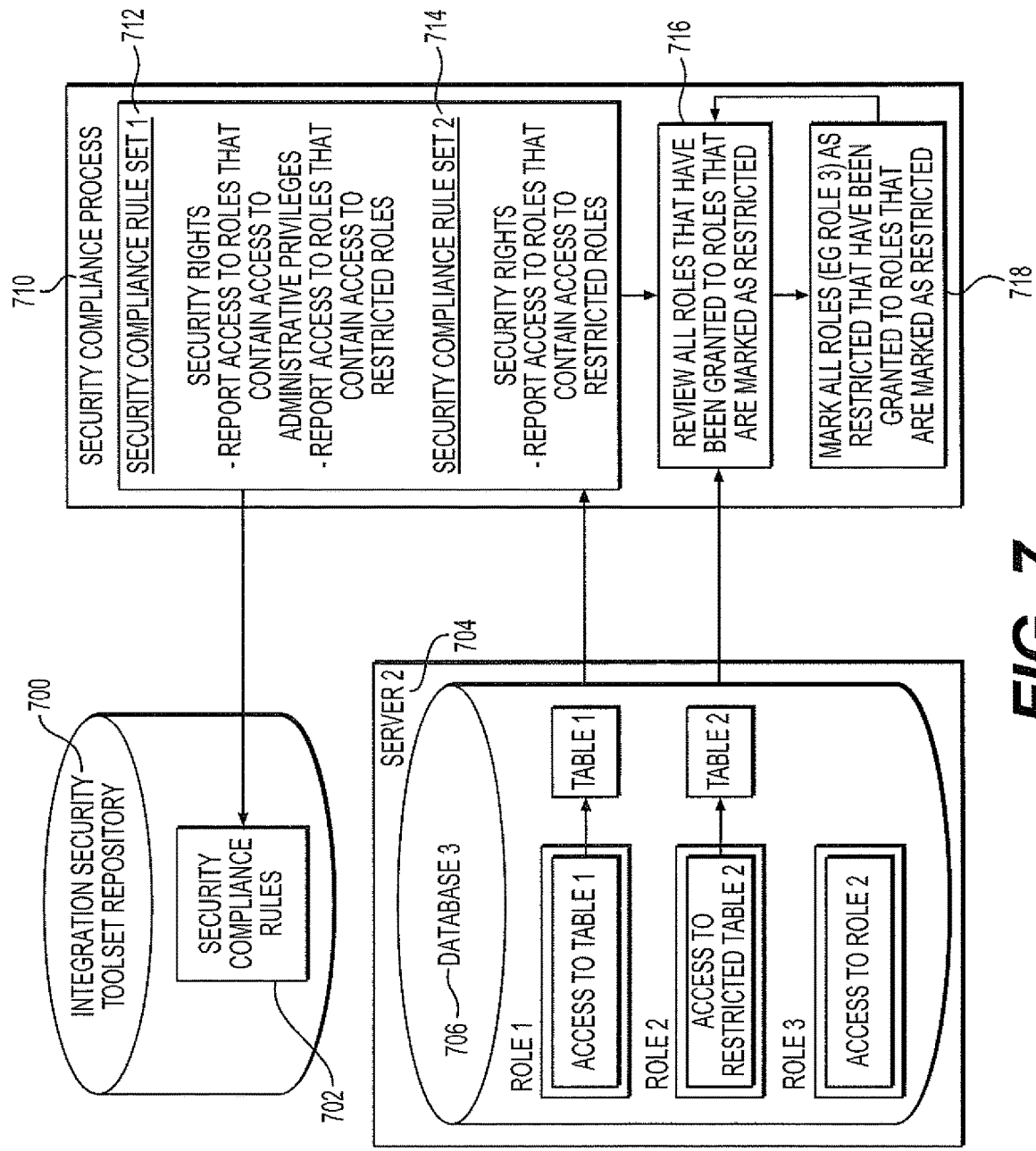
FIG. 7 is a sample flowchart of how the integration system and method may work in part to recursively search roles for rights that need to be protected.

FIG. 7 illustrates the security compliance process 710 in conjunction with the integration security toolset repository 700. The security compliance process 710 includes security compliance rule sets 1 712 and 2 714. These security compliance rule sets 712 and 714 are stored in the repository 700 as rules 702. In this example, there is a server 2 704 that has a database 3 706 that includes three roles. In the security compliance process 710 the rule sets 712 and 714 are reviewed 716 so that role 1 in the database 3 706 is marked as restricted. In the security compliance process 718 all roles granted a restricted role in the database 3 706 are marked as restricted (role 3) and this process is repeated until all roles granted a restricted role either directly or through another set of one or more roles have been searched.

Figure 8:
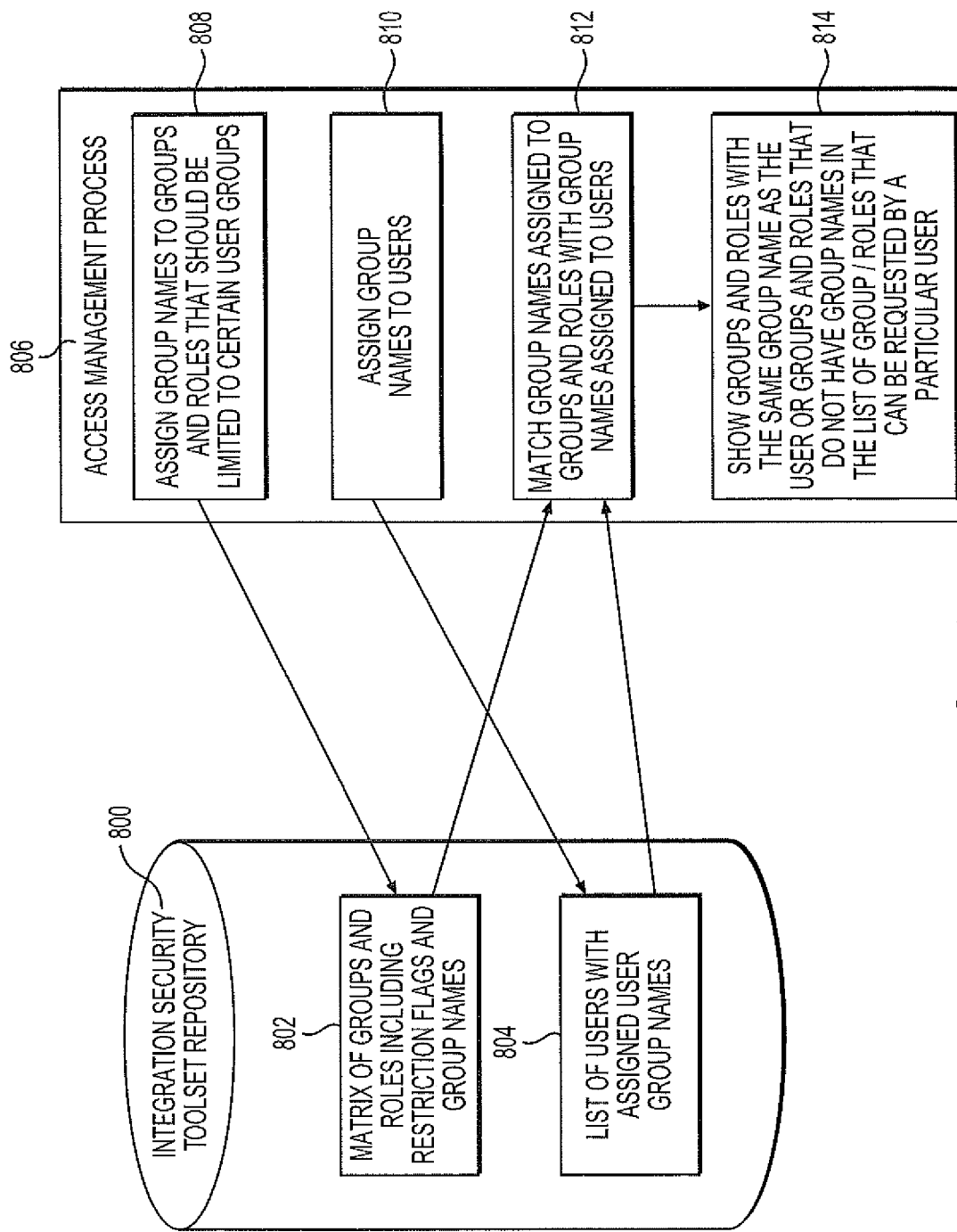
FIG. 8 is a sample flowchart of how the integration system and method may work in part to hide groups and roles from users who are not authorized to request them.

In FIG. 8, the integration security toolset repository 800 includes a matrix 802 of groups and roles including restriction flags and group names as well as a list 804 of users with assigned user group names. Then, in the access management process 806, group names are assigned 808 to groups and roles that should be limited to certain user groups. Group names are then assigned 810 to users. The group names assigned to groups and roles are then matched 812 with group names assigned to the users. And then, groups and roles are shown 814 in the access management process with the same group name as the user or groups and roles that do not have group names in the list of group/roles that can be requested by a particular user.

Figures 9A, 9B:
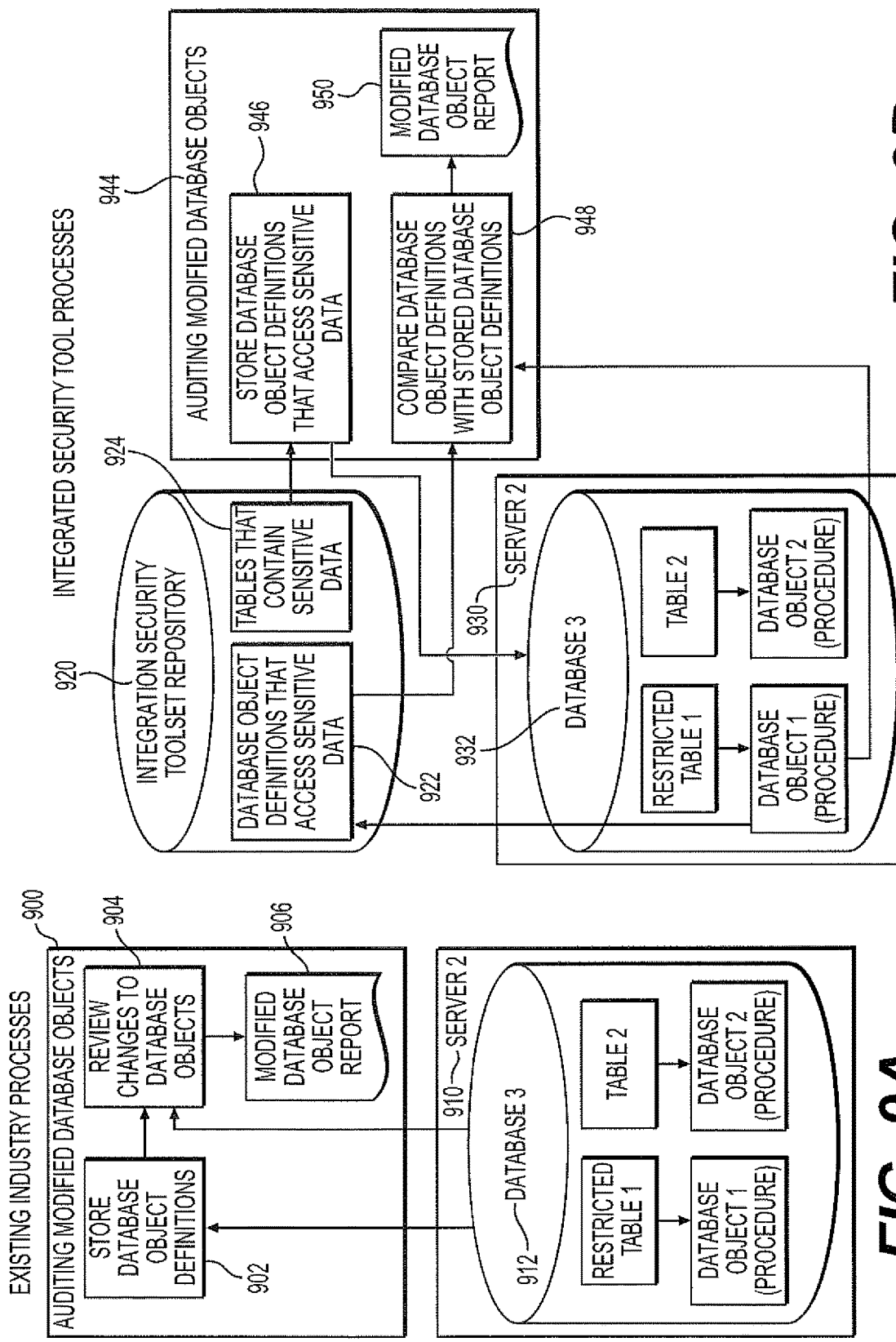
FIG. 9A is a sample flowchart displaying how prior art security systems work in part.
FIG. 9B is a sample flowchart of how the integration system and method may work in part to focus auditing on database objects that access sensitive data.

FIG. 9A illustrates the current, prior art method of auditing modified database objects 900. There is a database 902 of stored database object definitions that reviews 904 changes to database objects to then create a report 906 of modified database objects. A server 2 910 includes a database 3 912 including its tables and database objects as indicated.

FIG. 9B illustrates an auditing modified database objects 944 that includes a store of database object definitions 922 that access sensitive data. The auditing 944 includes a comparison 948 of database object definitions with stored database object definitions to generate a modified database object report 950. An integration security toolset repository 920 includes a database object definitions 922 that access sensitive data as well as a list of tables 924 that contain sensitive data. The auditing 944 is shown in the example of a database 3 932 in server 2 930.

Figure 10:
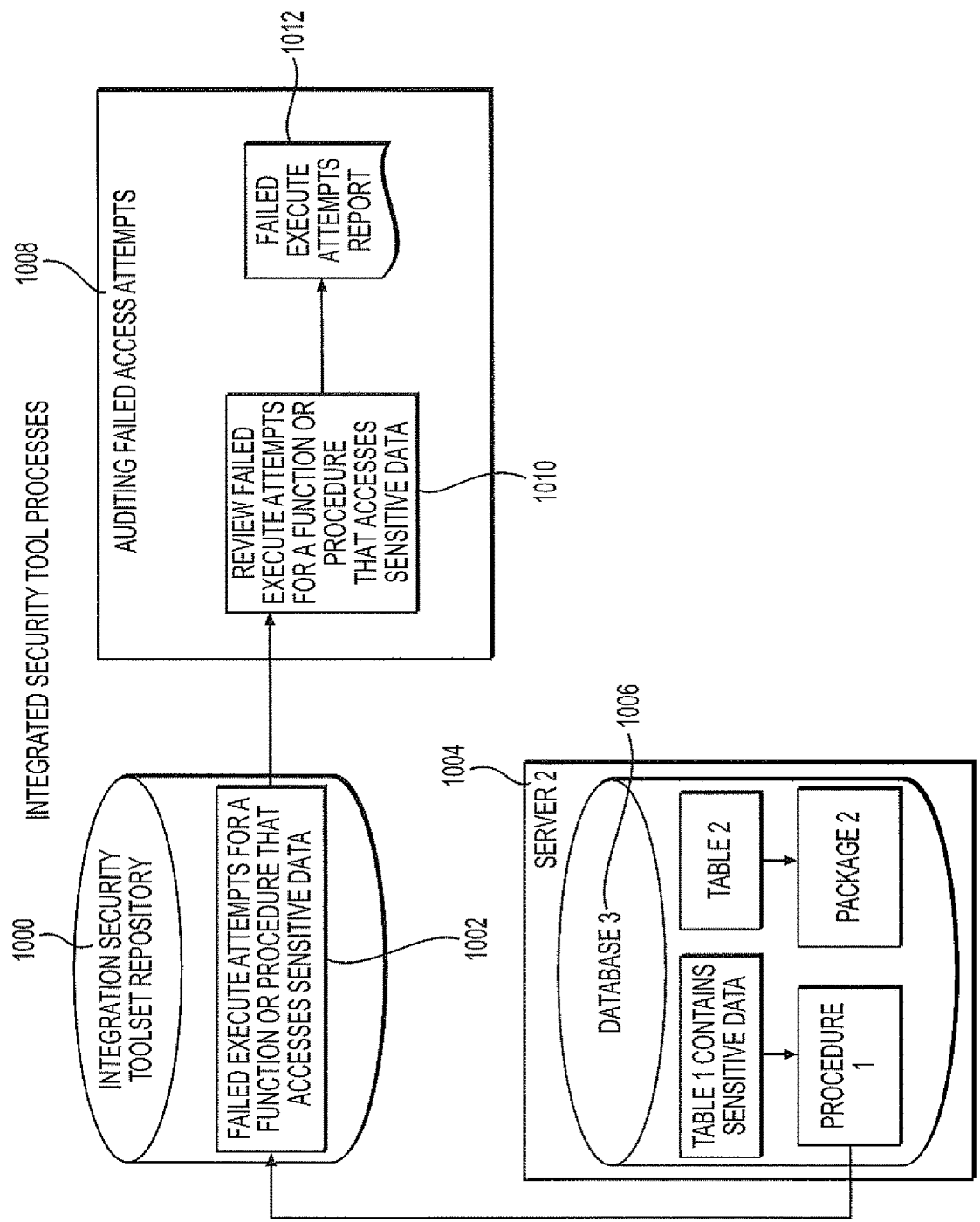
FIG. 10 is a sample flowchart of how the integration system and method may work in part to audit failed access attempts to a function or procedure that accesses sensitive data.

FIG. 10 illustrates a process for auditing failed access attempts 1008. There is an example database 3 1006 in server 2 1004 that includes a table 1 with sensitive data as shown. An integration security toolset repository 1000 contains a list of failed execute attempts 1002 for a function or procedure that accesses sensitive data. The auditing process 1008 includes a review 1010 of failed execute attempts for a function or procedure that accesses sensitive data and then reports 1012 the failed execute attempts.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A method of integrating an organizational security system comprising the steps of:

first undertaking a sensitive data search process that produces a sensitive data report that identifies files on servers and tables in databases in an organization that require protection so that these files and tables can be added to security compliance rules that are used by an access management process and a security compliance process whereby the organization systems communicate and interact in a proactive manner rather than reactively; then after producing the sensitive data report, a. providing an access management process for the organization comprising a plurality of servers and databases, wherein the access management process creates a matrix of groups from the servers and roles from the databases that can be requested by a user and after approval by the user's manager, and the access management process grants the requested groups and roles to a user to provide access for the user to one or more of the organization servers and databases;

b. providing an integration tool that operatively marks the matrix of groups from the servers and the roles from the databases as restricted if they have been granted rights that violate the rules in the sets of the security compliance rules; and further wherein the integration tool provides a reviewable list of modified database objects that are dependent on restricted tables, thereby concentrating the security compliance process on database objects that access sensitive information and not on all database objects within the database;

c. wherein the integration tool allows the access management process to highlight restricted groups and roles identified in b. during an initial user access request or profile creation, during the approval step performed by the user's manager, as well as allowing requests for restricted groups and roles to be optionally routed through a second approval step performed by a security subject matter expert, thereby preventing restricted groups and roles from being accidentally granted to users and eliminating the need to go back later and remove those restricted groups and roles;

d. wherein the integration tool provides a reviewable audit log of failed access attempts on functions or procedures that access tables with sensitive information, thereby concentrating the security compliance process on functions or procedures that access sensitive information and not on all functions or procedures within the database; and e. providing a security compliance process comprising sets of security compliance rules that define security configurations for the organization servers and databases and that define groups on the servers and roles in the databases that need to be protected, and wherein the security compliance process identifies and reports on any violations of the rules in the sets of the security compliance rules by the security configurations and the assigned groups on the servers and the roles in the databases, and further wherein the integration tool comprises a security compliance process that compares the access management requests and profiles with the security compliance violations to determine if any violations of the security compliance rules can be ignored because of a corresponding access management request or profile that has all necessary approvals based on the level of access requested.

2. A method of integrating an organizational security system as described in claim 1, wherein the integration tool comprises an auditing process that compares access attempts to restricted files/tables with a baseline to detect a suspicious access attempt to identify possible intrusion of a protected file/table, wherein the baseline is the list of previous user access from the same user or users with similar access, thereby concentrating the process on files/tables that contain sensitive information and not on all files/tables.

3. A method of integrating an organizational security system as described in claim 2, wherein the integration tool provides a workflow to allow a security group to be able to accept suspicious access attempts so that the approved access attempts can be added to the approved baseline.

4. A method of integrating an organizational security system as described in claim 1, wherein the integration tool comprises a security compliance process that marks all roles as restricted that have been granted restricted roles, and further wherein the searching process would be performed recursively until all role grants have been searched, thereby ensuring that all roles are marked as restricted that have access to restricted rights through an iterative process of granting roles to other roles creating a chain of access.

5. A method of integrating an organizational security system as described in claim 1, wherein the integration tool comprises an access management process that can limit the list of requestable roles or groups to those that do not have a group name and those that have the same group name as the user who is requesting the roles or groups in the access management process.

* * * * *